July 28, 1925.
C. GREEN
VEHICLE AXLE
Filed Sept. 24, 1924
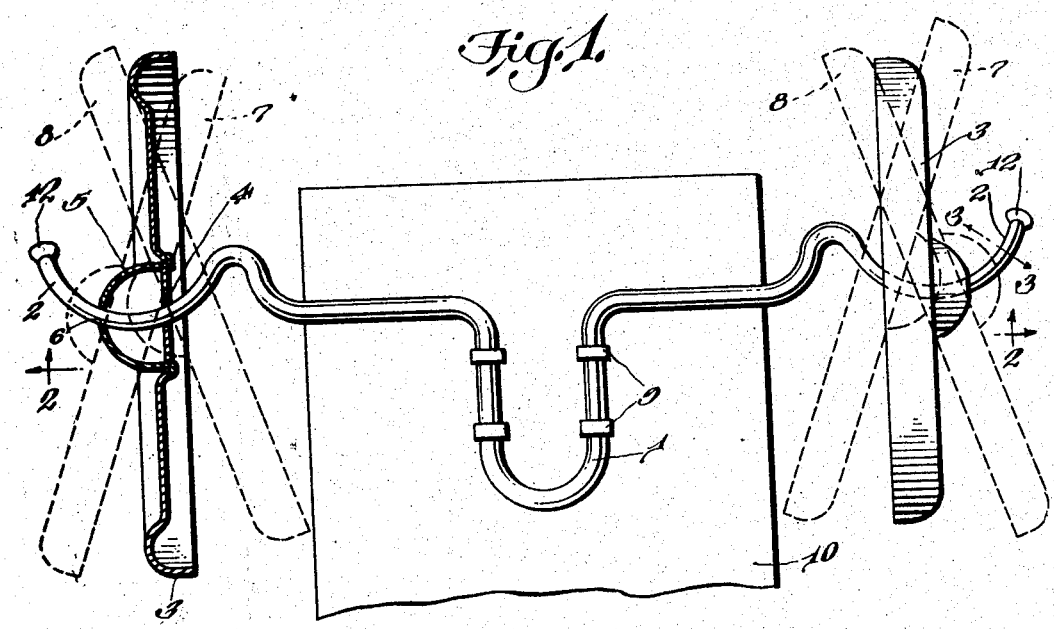
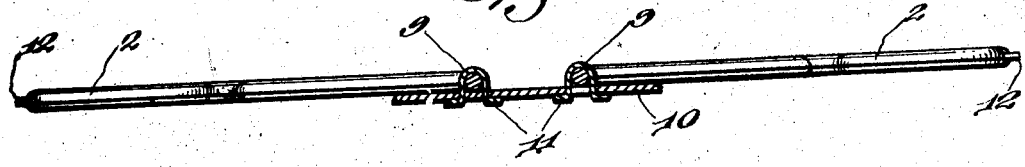
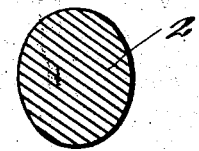
Carl Green
INVENTOR
BY Victor J. Evans
ATTORNEY Patented July 28, 1925.

1,547,870

UNITED STATES PATENT OFFICE.

CARL GREEN, OF CHICAGO, ILLINOIS.

VEHICLE AXLE.

Application filed September 24, 1924. Serial No. 739,670.

*To all whom it may concern:*

Be it known that I, CARL GREEN, a citizen of the United States, residing at 1354 N. Dearborn Street, Chicago, in the county of Cook and State of Illinois, have invented new and useful Improvements in Vehicle Axles, of which the following is a specification.

This invention relates to new and useful improvements in vehicle axles and more particularly to a front axle which is used on toys where movement is conveyed to the toy by means of a cart or the like. The main object of my invention is the provision of an axle for supporting the front wheels of a toy vehicle so that the wheels will readily swing to the proper angle with respect to the vehicle while being turned to prevent overturning of the toy.

Another object of my invention is the provision of an axle for a toy vehicle which can be quickly and readily placed in position upon the toy and is preferably used as the front and steering axle and is provided with curved supporting ends upon which the wheels are mounted to permit the wheels to swing to various angles or positions with respect to the body of the toy.

With the above and other objects in view, the invention consists in the novel features of construction, the combination and arrangements of parts hereinafter more fully set forth, pointed out in the claim and shown in the accompanying drawings, in which:

Fig. 1 is a bottom plan view of my invention.

Fig. 2 is a section on the line 2—2 of Fig. 1.

Fig. 3 is a section on the line 3—3 of Fig. 1.

In carrying out my invention it is preferred to construct this particular type of axle of a heavy wire or the like, the intermediate portion of the axle being bent into U-shaped form and secured to the bottom of the vehicle in any desired manner. The ends of the U-shaped center are extended in opposite directions across the front of the vehicle and projected beyond each side of the vehicle. The extreme ends of the axle are curved as at 2 to form a bearing for the wheels 3.

The wheels 3 are each formed with a central opening 4 to receive the curved end 2 of the axle and in order to support the wheels in the various positions, each wheel is provided with a semi-spherical extension 5 having a central opening 6 arranged in alignment with the opening 4 and receiving the curved end of the axle.

From the above it will be readily apparent that as the vehicle moves forwardly in a direct line the wheels will be retained in an upright position as shown in the full lines in Fig. 1, but should the vehicle be turned in either direction, the wheels will be permitted to readily swing to various angular positions, due to the curvature of the ends of the axle, the walls of the openings 4 and 6 engaging with the axle and riding thereon to cause the wheels to assume this position. It will be noted that the upper and lower edges of the curved ends 2 of the axle are arcuate to conform to the openings 4 and 6 while the opposite faces thereof are oval shape as shown in Fig. 3. This construction provides a free transverse swinging movement of the wheels but still retains the close frictional engagement with the ends of the axle.

As noted in Fig. 1, should the vehicle be turned to the right the wheels will assume the position indicated by the dotted lines at 7 while the turning movement of the vehicle to the left will cause the wheels to assume the dotted line position as at 8, thus keeping the vehicle in an upright position during the turning movement.

Various types of means may be used for securing the axle to the vehicle but in the present instance I have illustrated U-shaped clips 9 engaging the side portions of the U-shaped central portion 1 and extending through the plate 10 with the ends of the clips overturned as at 11. The outer ends of the axle are provided with stops 12 to prevent the wheels from being entirely removed from the end of the axle.

While I have shown and described the preferred embodiment of my invention, it will be understood that various changes and alterations may be made without departing from the spirit of the invention or the scope of the appended claim.

Having thus described my invention, what I claim is:

In combination with an axle having an arcuate and curved bearing at each end thereof, supporting wheels having a central opening to receive said curved bearings, a semispherical extension at the center of each wheel upon one side thereof and having an opening in alignment with the first opening for receiving said curved portions, the upper and lower edges of said curved portions being arcuately curved and having oval shaped sides whereby to provide a free transverse swinging movement of the wheels but at the same time retaining close frictional engagement between the openings and the axle.

In testimony whereof I affix my signature.

CARL GREEN.